United States Patent [19]

Hirano

[11] Patent Number: 4,613,963
[45] Date of Patent: Sep. 23, 1986

[54] TRACKING-SERVO DEVICE

[75] Inventor: Hiroyuki Hirano, Saitama, Japan

[73] Assignee: Pioneer Electronic Corporation, Saitama, Japan

[21] Appl. No.: 507,649

[22] Filed: Jun. 27, 1983

[30] Foreign Application Priority Data

Jun. 25, 1982 [JP] Japan .................................. 57-109337

[51] Int. Cl.⁴ ............................................. G11B 21/08
[52] U.S. Cl. ......................................... 369/44; 358/907
[58] Field of Search ................... 369/44, 43; 358/907, 358/342; 360/10.1, 10.2, 35.1

[56] References Cited

U.S. PATENT DOCUMENTS 4,057,832 11/1977 Kappert ........................ 358/907 X
4,239,942 12/1980 Van Alem et al. .............. 369/44 X
4,408,312 10/1983 Sugiyama et al. ................... 369/43

Primary Examiner—Robert L. Richardson
Attorney, Agent, or Firm—Sughrue, Mion, Zinn, Macpeak and Seas

[57] ABSTRACT

A tracking-servo device is provided with a holding mechanism effective to substantially hold a tracking error signal produced just prior to the opening of the tracking-servo loop during a jump-drive operation, so that any restoration force acting on the tracking control actuator during the jump-drive can be cancelled out.

10 Claims, 11 Drawing Figures

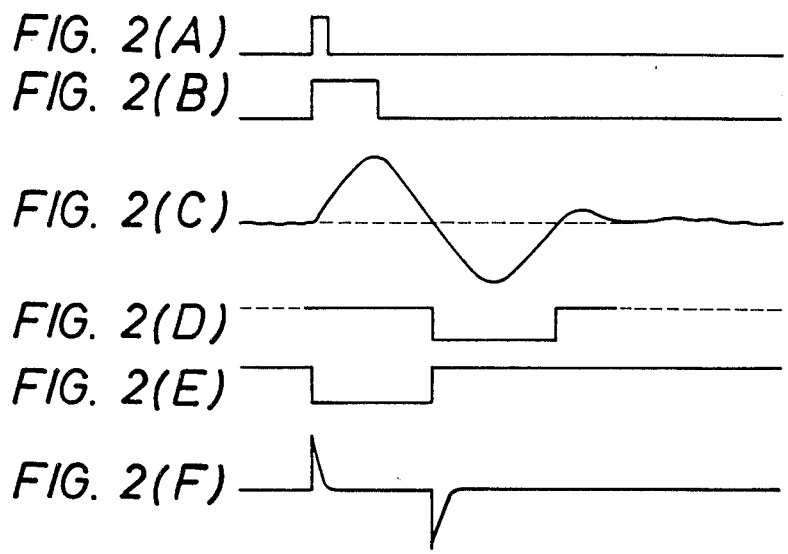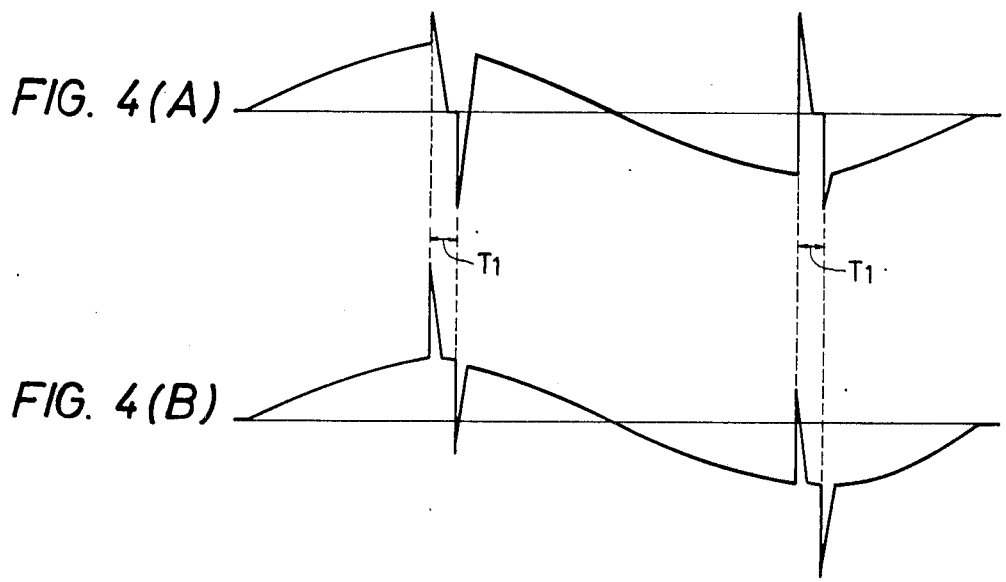

TRACKING-SERVO DEVICE

BACKGROUND OF THE INVENTION

The present invention relates to a tracking-servo device for use in a recorded information readout device, and, particularly, to a tracking-servo device for effectively controlling the track jumping operation of a information pick-up detecting point during the so-called random access period for the recorded information search on the recording medium.

In a reading device for reproducing information recorded on a recording disc such as video disc or digital audio disc, the so-called tracking-servo system is utilized since the information pick-up detecting point must always trace recording tracks even if the recording tracks are eccentric. Further it is usual that, in reproducing such discs, there is provided a random access function for an information search, and thus the information detecting point is driven substantially orthogonally to the tracks to realize track jumping control.

A schematic block diagram of such a device is shown in FIG. 1 as applied to an optical information reading device. In the same figure, a reading light spot 2 which defines the information detecting point is projected onto a recording track 1 of a recording medium, and reproduction of the information is performed using the reflection of the spot 2. In addition to the spot 2, a pair of light spots 3 and 4 are projected onto the medium such that the light spots 3 and 4 are positioned on opposite side edges of the track 1, respectively, when the spot 2 lies on a center line of the track. Reflections of the light spots 3 and 4 are detected by light receiving elements 5 and 6, respectively, and the difference between the output of the elements is obtained by a differential amplifier 7. The output difference (C) represents the orthogonal deviation of the information reading light spot 2 from the recording track 1. That is, the so-called tracking error signal is obtained from the output (C) of the differential amplifier 7.

The error signal (C) is supplied through an equalizer 8 and a loop switch 9 to a drive amplifier 10. An output of the latter amplifier is used to drive a tracking actuator for shifting the information detecting point 2 orthogonally to the track. The actuator, for example, is composed of a coil 11 and a tracking mirror 12 rotated by the coil in operation. Current flowing through the coil 11 is detected by a resistor 13 and an output from the resistor is fed back to the amplifier 10 to stabilize the system.

In addition to the tracking-servo system described above, a jumping operation control system is provided to make a random access possible. After any noise component of the tracking error signal (C) is removed by a low pass filter (LPF) 14, it is supplied to a comparator 15. The comparator 15 is a so-called zero level comparator, and an output (D) of the comparator 15 is supplied to respective inputs of switch controllers 16 and 17. An output (E) of the controller 16 is used to control the loop switch 9 in an on-off manner. On the other hand, the switch controller 16 is controlled by an output of the controller 17, which has a jump instruction signal (A) as one of its inputs. A jump-drive circuit 18 is actuated by the other output of the controller 17 to produce a jump-drive and jump damping waveform (F), which is supplied to the input of the amplifier 10.

FIG. 2 shows the operational waveforms in the device in FIG. 1, in which FIGS. 2A to 2F show the waveforms of the respective signals (A)-(F) indicated in FIG. 1. When the jump instruction signal (A) is supplied to the controller 17, a signal output (B) is provided at the output thereof. In response to the timing of the output (B), the output (E) of the switch controller 16 is changed from a high level to a low level as shown in FIG. 2E, causing the loop switch 9 to turn off. Therefore, the servo loop is opened when the level of the control output (E) is low. The jump-drive circuit 18 is actuated by the instruction from the controller 17 to produce a jump-drive waveform (F) shown in FIG. 2F, which is supplied through the amplifier 10 to the drive coil 11 forming a part of the actuator.

Accordingly, the tracking mirror 12 is rotated to thereby move the spot 2 orthogonally to the track, to thereby produce an error signal (C) (FIG. 2C) from the amplifier 7. The error signal amplitude initially increases up to a peak valve and then decreases, and reaches zero when the spot 2 arrives around the center of the recording track. At the moment when the error amplitude becomes 0, the output of the comparator 15 changes its state as shown in FIG. 2D. In response to this change of the output (D), the controller 17 is actuated to cause the jump-drive circuit 18 to produce a jump damping waveform F to restrict movement of the actuator. At the same time, the output (E) of the switch controller 16 is changed from a low level to a high level to turn the loop switch 9 on to thereby complete the servo loop.

In this manner, the information reading spot 2 is moved to an adjacent track to complete the jump operation. The waveform (B) in FIG. 2B is used to make the switch controller 16 inoperative so that it does not detect a zero crossing point of the negative going portion of the waveform (D) until the waveform (D), which is the output of the comparator 15, becomes settled.

In this case, the tracking actuator is supported by a resilent member or a viscous-resilent member so that a reaction or restoration force proportional to the amount of deviation of the actuator from a mechanical neutral position thereof is exerted thereon. When reproduction of a recording disc having a large amount of eccentricity is desired, the deviation of the actuator from the mechanical neutral position thereof becomes correspondingly large. Where a jump operation should be performed under such a condition, the drive signal (F) from the jump drive circuit 18 flows through the coil 11 when the servo loop switch 9 of the device in FIG. 1 is turned off, and, simultaneously, a large restoration force may act on the largely deviated actuator just before the turn-off of the loop switch. Since the direction and amount of the restoration force are determined by the deviation angle and direction of the mirror 12 which has traced a desired recording track immediately before the commencement of jump, it is hard to determine the values thereof. Therefore, due to the restoration force having uncertain factors, the acceleration of spot movement when the servo-loop is opened may not be constant and it may be difficult to obtain a stable jump operation. This is particularly true in the reproduction of information from a disc having large eccentricity.

SUMMARY OF THE INVENTION

An object of the present invention is to provide a tracking-servo device which makes possible a stable jump operation regardless of the amount of eccentricity of the recording tracks.

In the tracking-servo device according to the present invention, a signal is generated which is capable of substantially cancelling the restoration force of the actuator for position control of the information detection point when the tracking-servo loop is opened. A combination of this signal and a jump drive signal is used as a drive signal for the actuator for the period during which the servo loop is opened.

BRIEF DESCRIPTION OF THE DRAWINGS

The present invention will be described hereinafter with reference to the accompany drawings, in which:

FIGS. 2(a) thru 2(f) show operational waveforms in the device shown in FIG. 1;

FIGS. 4(a) and 4(b) show waveforms useful in comparing the operations of the devices of FIGS. 1 and 3.

DETAILED DESCRIPTION OF THE PREFERRED EMBODIMENTS

Figure 1:
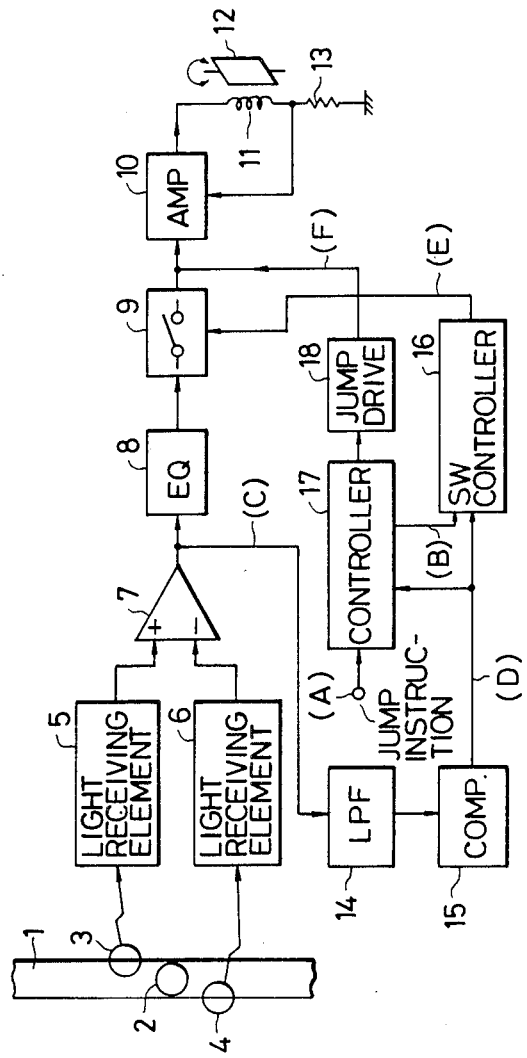
FIG. 1 is a block diagram of a conventional tracking-servo device.
Figure 3:
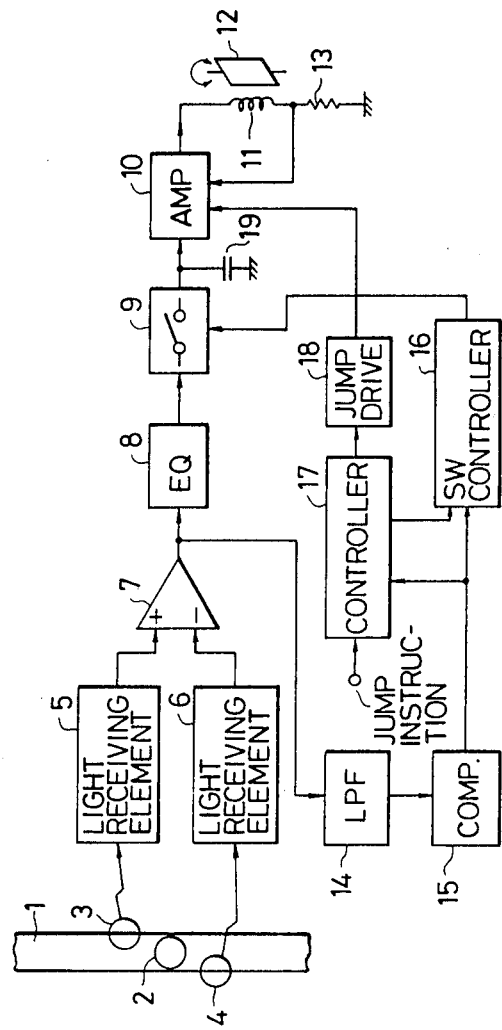
FIG. 3 is a block diagram showing an embodiment of the present invention.

FIG. 3 is a block diagram of an embodiment of the present invention in which parts similar to those in FIG. 1 are shown by the same reference numerals, respectively, and therefore an explanation of the details thereof are omitted. In this embodiment, a hold-capacitor 19 is connected between ground and a signal line connecting the servo loop switch 9 to the amplifier 10, so that the tracking error signal just prior to the turn-off of the loop is held in this capacitor.

With this circuit construction, when the loop switch 9 is turned off in response to the jump instruction and the servo loop is opened, the servo error signal just prior to the opening of the loop is substantially held in the hold capacitor 19. Therefore, the error signal immediately before loop opening is supplied and thus the drive signal supplied to the coil 11 of the actuator does not become zero immediately after the loop is opened. Thus the restoration force exerted on the tracking mirror 12 urging it to return to the neutral point is cancelled out. At the same time, the jump drive signal from the jump drive circuit 18 is added to the hold output to drive the actuator to thereby perform the jump operation, the timing thereof being equivalent to that shown in FIG. 2.

FIG. 4A shows the actuator driving waveform in the conventional device of FIG. 1, and FIG. 4B shows the comparable waveform in the device of FIG. 3. In these figures, period $T_1$ is the time during which the servo loop is opened, and the remaining periods represent times during which the servo loop is in operation. The period $T_1$ is short (several hundred $\mu$ sec.) during the jump operation and therefor the hold voltage of the hold capacitor 19 may not change considerably while the loop is opened, if the discharge time constant determined by the capacitor 19 and the input impedance of the amplifier 10 is selected very large. Therefore, the restoration force acting on the mirror 12 at the time of loop turn-off is substantially cancelled out regardless of the amount of the deviation of the tracking mirror 12 from its neutral position, (i.e., the amount of eccentricity of the disc track) and can be deemed as zero. Thus the mirror 12 is driven only by the drive signal from the jump drive circuit 18, and hence the acceleration of the mirror is determined only by the drive signal.

Figure 5:
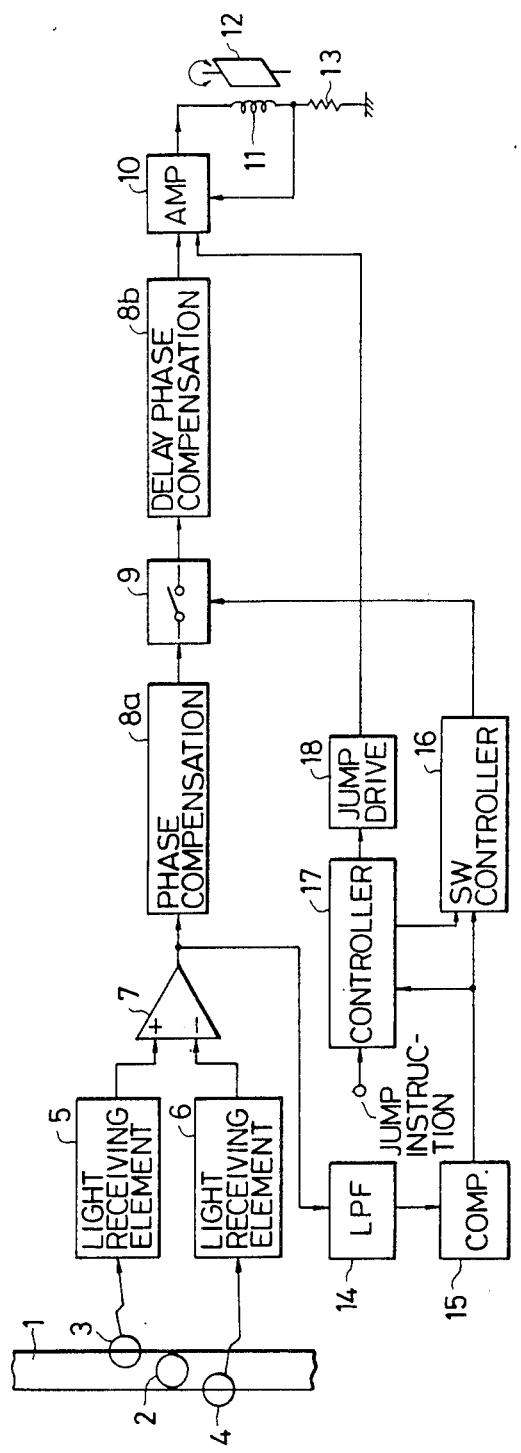
FIG. 5 is a block diagram showing another embodiment of the present invention.

FIG. 5 is a block diagram of another embodiment of the present invention, in which parts similar to those in FIG. 1 and/or FIG. 3 are again depicted by the same reference numerals. In this embodiment, a time constant circuit is used instead of hold capacitor 19 of FIG. 3. The time constant circuit is formed using the time constant circuit portion of the equalizer (8a and 8b) which determines the characteristics of the loop. That is, the equalizer is usually composed of a phase compensation circuit 8a and delay phase compensation circuit 8b, and the latter compensation circuit 8b has a large time constant. In this embodiment, the compensation circuit 8b is disposed in a stage subsequent to the loop switch 9 as a time constant circuit.

Due to the effect of the compensation circuit 8b, the error signal just prior to the turning-off of the loop can be held even after the loop switch 9 is turned off. Since the error signal may be substantially constant for several hundred $\mu$ second during the jump operation, the restoration force acting on the mirror 12 to return it to the neutral point is cancelled out as in the embodiment of FIG. 3.

Alternatively, it is possible to arrange the loop switch 9 between the amplifier 7 and the advance compensation circuit 8a with similar effects. Further, in the embodiment in FIG. 3, it is possible to arrange the loop switch 9 in the stage preceding the equalizer 8.

As described hereinbefore, according to the present invention, since it is possible to continue to supply a signal corresponding to even a large amount of deviation of the actuator from the mechanical neutral point thereof to the actuator when the loop switch is opened at the time of the jump operation, it becomes possible to cancel out the restoration force due to the deviation of the actuator and to realize a stable jump operation.

Although, in the foregoing embodiments, the present invention has been applied to optical information reading devices, it is, of course, applicable to other electrostatic type information reading devices.

What is claimed is:

1. In a reading device for reproducing information recorded in tracks on a recording disc, said device including a moveable transducer mechanism (11, 12, 13) that is subject to a restoration force when deflected and whose movement is controlled by a servo tracking means, said servo tracking means comprising:
    a first means (5, 6) for detecting at least two tracking signals on said disc;
    second means (7) responsive to said detected tracking signals for generating an error signal,
    third means (10) proportionally responsive to said error signal for driving said moveable transducer mechanism orthogonal to said tracks,
    fourth means (9) disposed between said second means and said third means that is adapted to be switched between a first position that transmits and a second position that blocks said error signal,
    fifth means, (16) responsive to said error signal, for operating said fourth means (9) between said first and said second positions;
    sixth means (15, 17, 18) responsive to an external command signal (A) to provide a jump drive signal to said third means (10), said sixth means operating selectively to provide drive signals and damp signals to said third means (10) and to control said fifth means (16) in its operation of said fourth means (9) to transmit or block said error signal from flowing between said second means (7) and said third means (10), the improvement comprising:

a signal generating means (8b, 19) for generating a signal effective to substantially cancel a restoration force exerted on said first means (5, 6).

2. A tracking-servo device as claimed in claim 1, wherein said signal generating means comprises holding means for holding substantially all of a tracking error signal produced just prior to the opening of said tracking-servo loop.

3. A tracking-servo devices as claimed in claim 2, wherein said holding means comprises a time constant circuit constituting a part of a phase compensation circuit defining the characteristics of said tracking-servo loop.

4. A tracking-servo device as claimed in claim 3 including an equalizer circuit connected between said second means and said third means, and comprising a phase compensation circuit (8a) and a delay phase compensation circuit (8b) disposed subsequent to said phase compensation circuit, said delay phase compensation circuit comprising said time constant circuit and being connected to said phase compensation circuit by said fourth means.

5. A tracking-servo device as claimed in claim 2, wherein said holding means comprises a holding circuit including a capacitor.

6. A tracking-servo device, adapted for use with a tracking actuator (11, 12) that is subject to a restoration force when deflected, comprising:

means (5, 6) for deflecting a actuator tracking error;

means (7, 8) for producing a first drive signal in response to the detection of said tracking error;

means (10) for controlling said actuator to modify its tracking position in response to said first drive signal, thereby forming a tracking servo loop;

switch means (9) located between said tracking error signal producing means (7, 8) and said actuator controlling means;

means (17, 18) for producing a second drive signal for directly controlling said actuator to move in response to said second drive signal;

means (16) for controlling a said switch means so as to open said switch means (9) in response to said second drive signal and to thereby open said tracking-servo loop; and signal generating means (8b, 19) for generating a signal effective to substantially cancel a restoration force exerted on said actuator during the duration of said second drive signal.

7. A tracking-servo device as claimed in claim 6, wherein said signal generating means comprises holding means for holding substantially all of a tracking error signal produced just prior to the opening of said tracking-servo loop.

8. A tracking-servo device as claimed in claim 7, wherein said holding means comprises a time constant circuit constituting a part of a phase compensation circuit defining the characteristics of said tracking-servo loop.

9. A tracking-servo device as claimed in claim 8, wherein said holding means comprises a holding circuit including a capacitor.

10. A tracking-servo device as claimed in claim 8, including an equalizer circuit connected between said means for producing and said means for controlling and comprising a phase compensation circuit (8a) and a delay phase compensation circuit (8b) disposed subsequent to said phase compensation circuit, said delay phase compensation circuit comprising said time constant circuit and being connected to said phase compensation circuit by said switch means.

* * * * *